(12) United States Patent
Falconetti et al.

(10) Patent No.: US 10,111,130 B2
(45) Date of Patent: Oct. 23, 2018

(54) SUPPORTING DELIVERY OF DATA PACKETS USING TRANSMISSION CONTROL PROTOCOL IN A WIRELESS COMMUNICATION NETWORK

(71) Applicant: Telefonaktiebolaget LM Ericsson (publ), Stockholm (SE)

(72) Inventors: Laetitia Falconetti, Järfälla (SE); Torsten Dudda, Aachen (DE); Sebastian Nagel, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/551,059

(22) PCT Filed: Feb. 23, 2015

(86) PCT No.: PCT/EP2015/053712
§ 371 (c)(1),
(2) Date: Aug. 15, 2017

(87) PCT Pub. No.: WO2016/134740
PCT Pub. Date: Sep. 1, 2016

(65) Prior Publication Data
US 2018/0070263 A1    Mar. 8, 2018

(51) Int. Cl.
*H04W 28/02* (2009.01)
*H04L 29/06* (2006.01)
(Continued)

(52) U.S. Cl.
CPC ......... *H04W 28/0273* (2013.01); *H04L 47/28* (2013.01); *H04L 47/30* (2013.01);
(Continued)

(58) Field of Classification Search
CPC ......... H04L 47/28; H04L 47/30; H04L 47/37; H04L 69/16; H04W 28/0273; H04W 88/12
See application file for complete search history.

(56) References Cited

U.S. PATENT DOCUMENTS

| 7,426,181 B1 * | 9/2008 | Feroz ................. H04L 47/10 370/230 |
|---|---|---|
| 2003/0103452 A1 | 6/2003 | Le et al. |

(Continued)

OTHER PUBLICATIONS

Paxon, V. et al., "Computing TCP's Retransmission Timer", Internet Engineering Task Force (IETF) Request for Comments: 6298, Obsoletes: 2988, Updates: 1122, Category: Standards Track, Jun. 2011, pp. 1-11.

(Continued)

*Primary Examiner* — Mohamed A Kamara
(74) *Attorney, Agent, or Firm* — Sage Patent Group

(57) ABSTRACT

The present disclosure generally relates to the field of data delivery. More specifically, the present disclosure relates to a technique of supporting delivery of data packets using Transmission Control Protocol (TCP) in a wireless communication network. A method embodiment comprises identifying (S202), by a base station of the wireless communication network, an imminent end of a slow start phase of TCP congestion control. The method further comprises adapting (S204) a characteristic of the delivery of the data packets in the wireless communication network, if the imminent end of the slow start phase is identified.

16 Claims, 10 Drawing Sheets

(51) Int. Cl.
  *H04L 12/801* (2013.01)
  *H04L 12/841* (2013.01)
  *H04L 12/835* (2013.01)
  *H04W 88/12* (2009.01)

(52) U.S. Cl.
  CPC .............. *H04L 47/37* (2013.01); *H04L 69/16* (2013.01); *H04W 88/12* (2013.01)

(56) References Cited

U.S. PATENT DOCUMENTS

| | | | |
|---|---|---|---|
| 2003/0149785 A1* | 8/2003 | Gerla | H04L 29/06 709/232 |
| 2014/0056136 A1* | 2/2014 | Jain | H04L 47/12 370/230 |
| 2014/0286239 A1 | 9/2014 | Chowdhury et al. | |
| 2016/0205703 A1 | 7/2016 | Dudda et al. | |
| 2016/0380898 A1* | 12/2016 | Englund | H04L 47/14 370/235 |

OTHER PUBLICATIONS

Allman, M. et al., "TCP Congestion Control", Network Working Group, Request for Comments: 5681, Obsoletes: 2581, Category: Standards Track, Sep. 2009, pp. 1-18.

\* cited by examiner

SUPPORTING DELIVERY OF DATA PACKETS USING TRANSMISSION CONTROL PROTOCOL IN A WIRELESS COMMUNICATION NETWORK

TECHNICAL FIELD

The present disclosure generally relates to the field of data delivery. More specifically, the present disclosure relates to a technique of supporting delivery of data packets using Transmission Control Protocol in a wireless communication network.

BACKGROUND

In communication networks, reliable data delivery is of utmost importance. This is typically ensured by the Transmission Control Protocol (TCP). TCP is one of the core protocols of the Internet Protocol (IP) suite (the entire suite is often called TCP/IP). IP works by exchanging pieces of information called packets. A packet is a sequence of octets (bytes) and consists of a header followed by a body. The header describes the packet's source, destination and control information. The body contains the payload data IP is transmitting.

When an application program desires to send a large chunk of data across the Internet using IP, instead of breaking the data into IP-sized pieces and issuing a series of IP requests, the application program can issue a single request to TCP and let TCP handle the IP details. Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. If the data still remains undelivered, its source is notified of this failure. Once the TCP receiver has reassembled the sequence of octets originally transmitted, the TCP receiver passes them to the receiving application.

That is, TCP provides reliable, ordered and error-checked delivery or notification of failure to delivery of data between computing devices such as programs running on computers connected to a local area network (LAN) or the public Internet. TCP is optimized for accurate delivery rather than timely delivery, and therefore, TCP sometimes incurs relatively long delays on the order of seconds while waiting for out-of-order messages or retransmissions of lost messages. Applications that do not require the reliability of a TCP connection may instead use the connectionless User Datagram Protocol (UDP), which emphasizes low-overhead operation and reduced latency rather than error checking and delivery validation. For example, real-time applications such as Voice over IP often make use of other protocols like the Real-time Transport Protocol (RTP) running over the UDP.

While IP handles actual delivery of the data, TCP keeps track of the individual units of data transmission, called segments, that a message is divided into for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (i.e. the Transport Layer) reassembles the individual segments and ensures they are correctly ordered and error free as it streams them to an application.

A main aspect of TCP is congestion control. TCP uses a number of mechanisms to achieve high performance and avoid congestion collapse, where network performance can decrease by several orders of magnitude. These mechanisms control the rate of data entering the network, keeping the data flow below a rate that would trigger collapse. Acknowledgments for data sent, or lack of acknowledgments, are used by senders to infer network conditions between the TCP sender and receiver. Coupled with timers, TCP senders and receivers can alter the behavior of the flow of data. This is more generally referred to as congestion control and/or network congestion avoidance. In TCP, senders employ a retransmission timeout (RTO) that is based on the estimated round-trip-time (RTT) between the sender and receiver. The behavior of this timer is specified in Request For Comments (RFC) 6298. TCP applies congestion control and can generally be distinguished to work in two phases, namely slow-start (which may also be referred to as slowstart or slow start) congestion and congestion avoidance. Modern implementations of TCP contain four intertwined algorithms: Slow-start congestion, congestion avoidance, fast retransmit, and fast recovery, as described in RFC 5681.

Slow-start is the initial part of the congestion control strategy used by TCP. Slow-start is used to avoid sending more data than the network is capable of transmitting, that is, to avoid causing network congestion. The algorithm is specified by RFC 5681 and is also known as the exponential growth phase. Slow-start begins initially with a congestion window size (cwnd) of 1, 2 or 10. The value of the congestion window will be increased with each acknowledgment (ACK) of each segment received by the transmitter, effectively doubling the window size each RTT. In other words, in this phase the congestion window, i.e. the number of TCP segments that can be in-flight, increases exponentially. To give an example, if 1 segment is sent and 1 ACK is received, the congestion window is increased by 1. If 2 segments are sent and 2 ACKs are received, the congestion window is increases twice by 1. The congestion window is further increased exponentially, if 4 or more segments are sent. A fast increase is important to utilize the full link capacity. How fast the increase happens depends on the RTT, i.e. the time between sending a segment and receiving the corresponding ACK. The transmission rate will be increased with slow-start algorithm until either a loss is detected, or the receiver's advertised window (rwnd) is the limiting factor, or the slow start threshold (ssthresh) is reached. If a loss event occurs, TCP assumes that it is due to network congestion and takes steps to reduce the offered load on the network. Although the strategy is referred to as "slow-start" (before slow-start was introduced in TCP, the initial pre-congestion avoidance phase which was used instead of the slow start phase was even faster), the used congestion window growth is quite aggressive, at least more aggressive than the subsequent congestion avoidance phase.

The second phase is called congestion avoidance. Once the ssthresh is reached in the slow start phase, TCP changes from slow-start algorithm to congestion avoidance algorithm. The congestion avoidance phase is more conservative. In the congestion avoidance phase, the congestion window increases for typical congestion avoidance algorithms only linearly, i.e. the congestion window is increased by 1 segment for each RTT.

The overall end-to-end delay, i.e. user experience, for services using TCP is influenced by the TCP congestion control.

SUMMARY

Accordingly, there is a need for an improved technique for supporting data packet delivery using Transmission Control Protocol (TCP).

According to a first aspect, a method of supporting delivery of data packets using Transmission Control Protocol (TCP) in a wireless communication network is provided. The method comprises identifying, by a base station of the wireless communication network, an imminent end of a slow start phase of TCP congestion control. The method further comprises adapting a characteristic of the delivery of the data packets in the wireless communication network, if the imminent end of the slow start phase is identified. In other words, if the imminent end of the slow start phase is identified, the method further comprises adapting a characteristic of the delivery of the data packets in the wireless communication network. The foregoing may be understood to mean that the method further comprises adapting a characteristic of the delivery of the data packets in the wireless communication network, if it is determined or identified that the end of the slow start phase is imminent. The imminent end of the slow start phase may be understood as a time instance or short time interval occurring at the end of or shortly before the end of the first phase of the TCP congestion control procedure, e.g., the two-phased TCP congestion control procedure.

The adaption of a characteristic of the delivery of the data packets may include different techniques for changing or adjusting the characteristic. For example, by applying one or more first techniques for adapting the characteristic of the delivery of data packets, latency of the data delivery may be enhanced or even optimized. By enhancing or optimizing latency, acknowledgements may be received faster than without latency-enhancement or even latency-optimization during the slow start phase (in the sense of latency, enhancement may be understood as reducing latency). As a consequence, a congestion window used during the slow start phase may be increased faster than without latency-enhancement or even latency-optimization. Further, for example, by applying one or more second techniques for adapting the characteristic of the delivery of data packets, throughput of the data delivery may be enhanced or even optimized. By enhancing or optimizing throughput, more data may be delivered than without throughput-enhancement or even throughput-optimization phase (in the sense of throughput, enhancement may be understood as increasing throughput).

To improve the overall end-to-end delay, i.e. user experience, for services using TCP, it may be beneficial to enhance or optimize the latency of the system during the TCP slow start phase. Alternatively or additionally, it may be beneficial to enhance or optimize the throughput of the system in the TCP congestion avoidance phase. In the following, some examples for throughput-enhancement and latency-enhancement are given for sake of explanation rather than limitation.

For throughput enhancement dual connectivity has been introduced recently. Dual connectivity is a feature defined from the user equipment (UE) perspective, wherein the UE may simultaneously receive from and transmit to at least two different network points. In particular, in dual connectivity no data duplication may be performed but one data packet may be sent either between the UE and one of the network points or between the UE and the one of the network points via the other of the network points. Dual connectivity is one of the features that are being standardized within the umbrella work of small cell enhancements within $3^{rd}$ Generation Partnership Program (3GPP) Rel-12. The two different network points are usually denoted as Master-eNodeB or in short MeNB and Secondary-eNodeB or in short SeNB. The two network nodes operate on different frequencies. The currently envisaged protocol architecture for Rel-12 supports three types of radio bearers, namely bearer served by MeNB, bearer served by SeNB, and bearer split over both MeNB and SeNB. To convey payload data, all bearer types described above may be used. Radio Resource Control (RRC) control signalling may only use bearers served by MeNB. The split bearer architecture can be activated dynamically for the UE by means of RRC reconfiguration of an existing MeNB radio bearer. For the uplink, i.e. in the direction from the UE to the network, the UE is statically (e.g. by RRC reconfiguration) configured to either route Packet Data Convergence Protocol (PDCP) Packet Data Units (PDUs) to the MeNB or SeNB Radio Link Control (RLC). In the downlink, i.e. in the direction from the network to the UE, however, the eNB may route PDCP PDUs dynamically via MeNB RLC or SeNB RLC (or via both, i.e. duplication) to the UE. The decision is on PDU individual level.

Various latency reduction techniques exist or are currently developed for Long Term Evolution (LTE). These techniques aim at reducing the LTE RTT. Pre-scheduling and semi-persistent scheduling schemes (including instant uplink access (IUA)) exist to decrease the time the UE needs to wait to send data in the uplink. In this regard, IUA, as described in e.g. unpublished PCT/EP2014/068509, may be characterized as an approach in which the UE may receive a long lasting uplink grant, e.g. a grant that grants resources to the UE periodically without the need of sending any explicit grant signal to the UE. This uplink grant may indicate to the UE resources usable for uplink data transmissions. The UE may use these resources if certain conditions may be met, e.g. if the UE may actually has data to send or a Buffer Status Report may have already been triggered. The UE may be capable of sending additional scheduling requests. If no data is to be transmitted by the UE, the UE might not transmitted padding data on the granted resources. Other examples for latency reductions are processing time reduction, i.e. time the UE or eNB needs to decode, encode and/or schedule data, or further also TTI reduction.

As TCP usually resides within an Internet server, it is unclear for the base station (eNodeB or eNB in terms of LTE) when to switch its radio configuration to enhance or optimize either latency or throughput. In dual connectivity, for split bearer, at medium to large backhaul delays, the full potential of dual connectivity for improving the user throughput is not guaranteed, if the SeNB is activated or utilized too early, i.e. when latency optimization is more beneficial for the end-to-end performance. For latency reduction techniques, which usually introduce also an additional overhead, i.e. reduced throughput, it may be beneficial to deactivate those techniques as soon as a throughput optimization is more beneficial for the end-to-end performance.

To enhance or even optimize the overall end-to-end delay for services using TCP, it may thus be beneficial to adapt the characteristic of the delivery of the data packets at an optimal time instance. This time instance may be related to or dependent on the imminent end of the slow start phase.

For example, this time instance may be the imminent end of the slow start phase, may be the end of the slow start phase or may be after the end of the slow start phase. In order to enable effective adaption of the characteristic of the delivery of the data packets, the imminent end of the slow start phase may be detected.

In the method according to the first aspect, there may be various ways for identifying the imminent end of the slow start phase. All of these ways may not only be used for identifying that the end of the slow start phase is imminent (approaching), but also for identifying that the end of the slow start phase is reached According to a first exemplary implementation, the step of identifying the imminent end of the slow start phase may comprise estimating, by the base station, the imminent end of the slow start phase based on a number of data packets received by the base station during a first predetermined time window. The step of estimating the imminent end of the slow start phase based on the number of data packets received by the base station during the first predetermined time window may comprise monitoring, by the base station, a number of data packets received during the first predetermined time window. Further, the step of estimating the imminent end of the slow start phase based on the number of data packets received by the base station during the first predetermined time window may comprise estimating, by the base station, that the end of the slow start phase is imminent, if a ratio of the number of data packets received during the first predetermined time window to the number of data packets received during a time window previous to the first predetermined time window is smaller than a first predetermined threshold value.

According to a second exemplary implementation, the step of identifying the imminent end of the slow start phase may comprise estimating, by the base station, the imminent end of the slow start phase based on a throughput of a terminal, served by the base station, during a second predetermined time window. The step of estimating the imminent end of the slow start phase based on the throughput of the terminal during the second predetermined time window may comprise monitoring, by the base station, a current throughput of the terminal over the second predetermined time window. Further, the step of estimating the imminent end of the slow start phase based on the throughput of the terminal during the second predetermined time window may comprise estimating, by the base station, a maximum achievable throughput of the terminal. Still further, the step of estimating the imminent end of the slow start phase based on the throughput of the terminal during the second predetermined time window may comprise estimating, by the base station, that the end of the slow start phase is imminent, if a ratio of the current throughput of the terminal to the maximum achievable throughput of the terminal is larger than a second predetermined threshold value.

According to a third exemplary implementation, the step of identifying the imminent end of the slow start phase may comprise estimating, by the base station, the imminent end of the slow start phase based on a time during which a buffer of the base station for buffering data packets during the slow start phase is empty. The step of estimating the imminent end of the slow start phase based on the time during which the buffer of the base station for buffering data packets during the slow start phase is empty may comprise recording, within a third predetermined time window, a time during which a buffer of the base station for buffering data packets during the slow start phase is empty. Further, the step of estimating the imminent end of the slow start phase based on the time during which the buffer of the base station for buffering data packets during the slow start phase is empty may comprise estimating, by the base station, that the end of the slow start phase is imminent, if a ratio of the time during which the buffer of the base station is empty to the third predetermined time window is smaller than a third predetermined threshold value.

According to a fourth exemplary implementation, the step of identifying the imminent end of the slow start phase may comprise estimating, by the base station, the imminent end of the slow start phase based on a time length of a stay of a data packet in a buffer of the base station. The step of estimating the imminent end of the slow start phase based on the time length of the stay of the data packet in the buffer of the base station may comprise monitoring a time instance at which the data packet arrives at the buffer of the base station. Further, the step of estimating the imminent end of the slow start phase based on the time length of the stay of the data packet in the buffer of the base station may comprise monitoring a time instance at which the data packet departs from the buffer of the base station. Still further, the step of estimating the imminent end of the slow start phase based on the time length of the stay of the data packet in the buffer of the base station may comprise determining the time length of the stay of the data packet in the buffer of the base station based on the monitored time instance at which the data packet departs from the buffer of the base station and the monitored time instance at which the data packet arrives at the buffer of the base station. Finally, the step of estimating the imminent end of the slow start phase based on the time length of the stay of the data packet in the buffer of the base station may comprise estimating that the end of the slow start phase is imminent, if the time length of the stay of the data packet in the buffer of the base station is larger than a fourth predetermined threshold value.

The method according to the first aspect may further comprise activating, by the base station, a secondary base station for dual connectivity. The step of activating the secondary base station for dual connectivity may be included in the step of adapting the characteristic of the delivery of the data packets in the wireless communication network. By activating the secondary base station for dual connectivity, throughput of the data delivery may be optimized.

The step of activating the secondary base station for dual connectivity may comprise activating, by the base station, the secondary base station for dual connectivity at the end or after the end of the slow start phase. By activating the secondary base station for dual connectivity at the end or after the end of the slow start phase, latency rather than throughput may be optimized during the slow start phase, and throughput rather than latency may be optimized at the end or after the end of the slow start phase.

The method may further comprise, after activation of the secondary base station for dual connectivity, forwarding, by the base station, one or more data packets to the secondary base station, if an expected queuing time of the one or more data packets in a buffer of the base station is larger than an expected delivery time of the one or more data packets to the secondary base station. The step of conditionally forwarding, by the base station, one or more data packets to the secondary base station may be included in the step of adapting the characteristic of the delivery of the data packets in the wireless communication network. In this way, dual connectivity may be exploited to provide higher throughput, if it is faster to forward the one or more data packets to the secondary base station than to let them queue up in the buffer of the base station. For example, the step of identifying the imminent end of the slow start phase may comprise determining if an expected queuing time of the one or more data packets in a buffer of the base station is larger than an expected delivery time of the one or more data packets to the secondary base station.

The method according to the first aspect may further comprise deactivating, by the base station, one or more currently activated latency reduction techniques. The step of deactivating one or more currently activated latency reduction techniques may be included in the step of adapting the characteristic of the delivery of the data packets in the wireless communication network. By deactivating the one or more currently activated latency reduction techniques, throughput of the data delivery may be optimized.

The step of deactivating one or more currently activated latency reduction techniques may comprise deactivating the one or more currently activated latency reduction techniques at the end or after the end of the slow start phase. By deactivating the one or more currently activated latency reduction techniques at the end or after the end of the slow start phase, latency rather than throughput may be optimized during the slow start phase, and throughput rather than latency may be optimized at the end or after the end of the slow start phase.

The one or more currently activated latency reduction techniques may comprise at least one of a shorter Transmission Time Interval (TTI) technique, a pre-scheduling technique, a semi-persistent scheduling technique, an instant uplink access technique, and a more robust link adaptation technique.

The method according to the first aspect may further comprise switching, by the base station, from a latency-enhanced or latency-optimized configuration to a throughput-enhanced or throughput-optimized configuration. The latency-enhanced or latency-optimized configuration has a lower latency than the throughput-enhanced or throughput-optimized configuration and the throughput-enhanced or throughput-optimized configuration has a higher throughput than the latency-enhanced or latency-optimized configuration. The step of switching from a latency-enhanced or latency-optimized configuration to a throughput-enhanced or throughput-optimized configuration may be included in the step of adapting the characteristic of the delivery of the data packets in the wireless communication network. By switching from a latency-enhanced or latency-optimized configuration to a throughput-enhanced or throughput-optimized configuration, throughput of the data delivery may be enhanced or optimized after the previous enhancement or optimization of latency.

The step of switching from a latency-enhanced or latency-optimized configuration to a throughput-enhanced or throughput-optimized configuration may comprise the step of activating a secondary base station for dual connectivity as set forth above. Alternatively or additionally, the step of switching from a latency-enhanced or latency-optimized configuration to a throughput-enhanced or throughput-optimized configuration may comprise the step of deactivating the one or more currently activated latency reduction techniques as set forth above. Alternatively or additionally, the step of switching from a latency-enhanced or latency-optimized configuration to a throughput-enhanced or throughput-optimized configuration may comprise the step of forwarding one or more data packets to the secondary base station, if an expected queuing time of the one or more data packets in a buffer of the base station is equal to or larger than an expected delivery time of the one or more data packets to the secondary base station, as set forth above.

The method may further comprise, after the activation of the secondary base station for dual connectivity, stop forwarding or not forwarding, by the base station, one or more data packets to the secondary base station, if an expected queuing time of the one or more data packets in the buffer of the base station is smaller than an expected delivery time of the one or more data packets to the secondary base station. In this way, although dual connectivity is provided by activation of the secondary base station, latency may be given higher priority than throughput, if it is faster to queue the one or more data packets in the buffer of the base station than to forward them to the secondary base station. A size of the buffer reserved for the not forwarded or, in other words, non-forwarded packets may be determined by multiplying the estimated throughput of the base station during a preconfigured time window with the expected delivery time of the one or more data packets to the secondary base station.

According to a second aspect, a computer program is provided. The computer program comprises program code portions for causing the steps of any one of the method aspects described herein to be performed, when the computer program is run on a computer system or on one or more computing devices. The computer program may be stored on a computer-readable recording medium or may be downloadable as a signal.

According to a third aspect, a base station for supporting delivery of data packets using Transmission Control Protocol (TCP) in a wireless communication network is provided. The base station comprises an identifying component and a processing component. The identifying component is configured to identify an imminent end of a slow start phase of TCP congestion control. The processing component is configured to adapt a characteristic of the delivery of the data packets in the wireless communication network, if the imminent end of the slow start phase is identified. In other words, the processing component is configured, if the imminent end of the slow start phase is identified, to adapt a characteristic of the delivery of the data packets in the wireless communication network. The foregoing may be understood to mean that the processing component is configured to adapt a characteristic of the delivery of the data packets in the wireless communication network, if it is determined or identified that the end of the slow start phase is imminent.

The processing component may further be configured to switch from a latency-enhanced or latency-optimized configuration to a throughput-enhanced or throughput-optimized configuration. The latency-enhanced or latency-optimized configuration has a lower latency than the throughput-enhanced or throughput-optimized configuration and the throughput-enhanced or throughput-optimized configuration has a higher throughput than the latency-enhanced or latency-optimized configuration.

The processing component may further be configured to activate a secondary base station for dual connectivity. The processing component may further be configured to deactivate one or more currently activated latency reduction techniques.

The processing component may further be configured, after an activation of a secondary base station for dual connectivity, to forward one or more data packets to the secondary base station, if an expected queuing time of the one or more data packets in a buffer of the base station is larger than an expected delivery time of the one or more data packets to the secondary base station.

The base station according to the third aspect may be configured to perform any of the method steps described herein. The base station according to the third aspect may comprise or be configured as a nodeB or an eNodeB. For example, the base station may be configured as a Master eNodeB in dual connectivity.

According to a fourth aspect, a wireless communication system is provided. The wireless communication system comprises the base station as described herein and one or more terminals such as user equipments (UEs). The wireless communication system may be configured to perform the steps of any one of the method aspects as described herein.

In general, the steps of any one of the method aspects described herein may equally be performed in one or more suitable components, devices or units, e.g. in suitable components of the base station and/or the wireless communication system.

BRIEF DESCRIPTION OF THE DRAWINGS

In the following, the present disclosure will further be described with reference to exemplary embodiments illustrated in the Figures, in which.

DETAILED DESCRIPTION

In the following description, for purposes of explanation and not limitation, specific details are set forth, such as specific network topologies including particular network nodes, in order to provide a thorough understanding of the present disclosure. It will be apparent to one skilled in the art that the present disclosure may be practiced in other embodiments that depart from these specific details. For example, although the present disclosure is described with reference to Long Term Evolution (LTE) as a specific example for a wireless communication network, the present disclosure may be practiced in any network to which mobile or stationary users using a corresponding user equipment (UE) may attach. For example, the present disclosure is applicable to other cellular networks such as Global System for Mobile Communications (GSM), Universal Mobile Telecommunications System (UMTS), LTE-Advanced (LTE-A) networks, or to Wireless Local Area Network (WLAN) or similar wireless networks.

Those skilled in the art will further appreciate that functions explained herein below may be implemented using individual hardware circuitry, using software functioning in conjunction with a programmed microprocessor or a general purpose computer, using an Application Specific Integrated Circuit (ASIC) and/or using one or more Digital Signal Processors (DSPs). It will also be appreciated that when the present disclosure is described as a method, it may also be embodied in a computer processor and a memory coupled to a processor, wherein the memory is encoded with one or more programs to cause the processor to perform the methods disclosed herein when executed by the processor.

Figure 1:
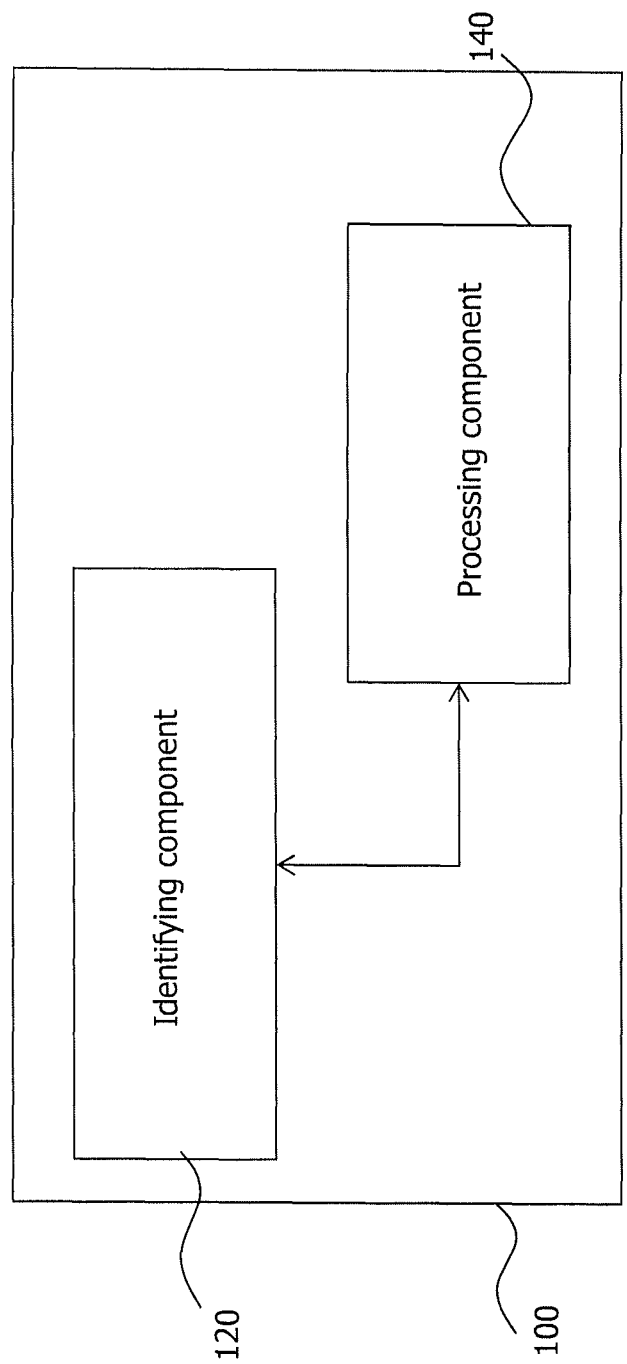
FIG. 1 is a schematic illustration of an embodiment of a base station.

FIG. 1 shows an embodiment of a base station 100. The base station 100 is adapted for supporting delivery of data packets using Transmission Control Protocol (TCP) in a wireless communication network. The base station 100 may be an eNodeB in terms of LTE or LTE-A. The base station 100 comprises an identifying component 120 and a processing component 140. The base station 100 will be further described below with respect to FIG. 2. In the following, for sake of explanation rather than limitation, the base station will be referred to as eNB 100 to illustrate, by way of example, that the technique proposed herein can be used and implemented in LTE.

Figure 2:
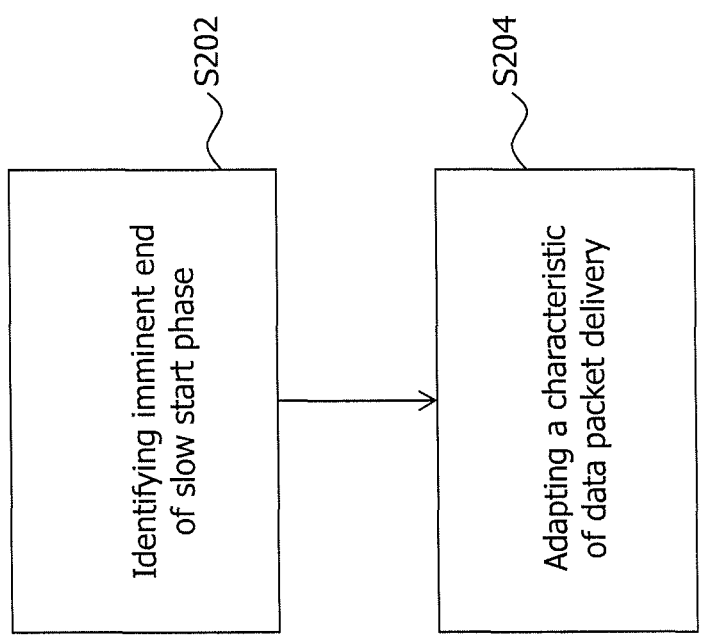
FIG. 2 is a flowchart illustrating a method embodiment performed in the base station of FIG. 1.

FIG. 2 shows a method embodiment which can be implemented in the eNB 100 according to the embodiment of FIG. 1. The method is for supporting delivery of data packets using TCP in a wireless communication network. In step S202, the identifying component 120 identifies an imminent end of a slow start phase of TCP congestion control. If the imminent end of the slow start phase is identified, a characteristic of the delivery of the data packets in the wireless communication network is adapted in step S204.

Further details regarding the eNB 100 and the method embodiment performed therein are described below with respect to FIGS. 3 to 10.

Step S202 of FIG. 2 can be implemented in various ways. In other words, there are various ways for identifying the imminent end of the slow start phase. Before these various ways are explained, the general concept of dual connectivity is explained with respect to FIG. 3.

Figure 3:
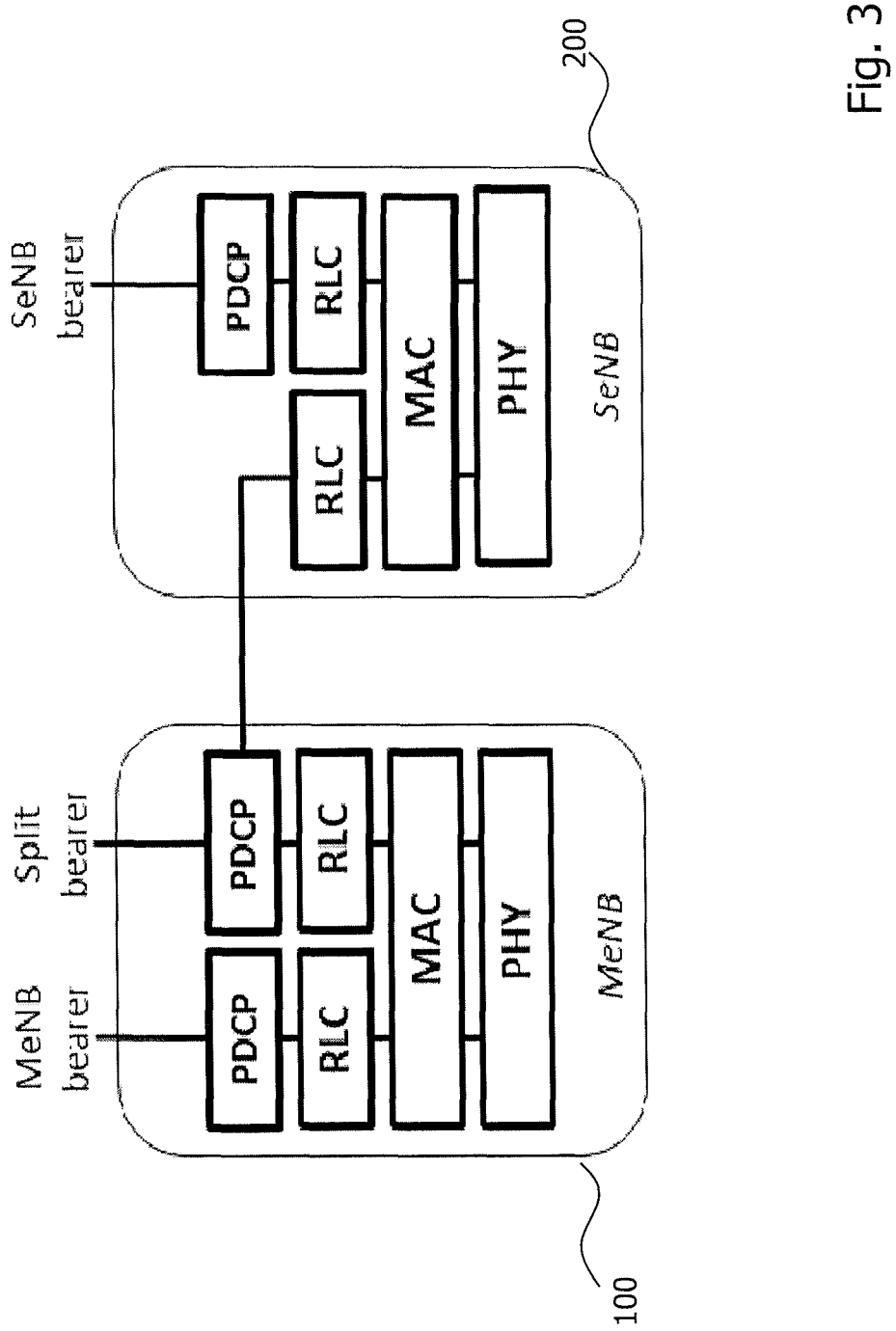
FIG. 3 schematically illustrates dual connectivity.

Dual connectivity is a feature defined from the user equipment (UE) perspective wherein the UE may simultaneously receive and transmit to at least two different network points. Dual connectivity is one of the features that are being standardized within the umbrella work of small cell enhancements in 3GPP Rel-12. The two different network points are usually denoted as Master-eNodeB (referred to as MeNB 100 in the following to illustrate, by way of example, that the eNB 100 of FIG. 1 may implement the functionality of MeNB 100 of FIG. 3) and Secondary-eNodeB (referred to as SeNB 200 in the following). MeNB 100 and SeNB 200 operate on different frequencies. FIG. 3 schematically shows the protocol architecture in dual connectivity. The currently envisaged protocol architecture for Rel-12, as shown in FIG. 3, supports three types of radio bearers, namely bearer served by MeNB 100 (left in FIG. 3), bearer served by SeNB 200 (right in FIG. 3), and bearer split over both MeNB 100 and SeNB 200 (middle in FIG. 3). To convey payload data, all of the aforementioned bearer types may be used. RRC control signalling may only use bearers served by MeNB 100.

The split bearer architecture of dual connectivity can be activated dynamically for the UE by means of Radio Resource Control (RRC) reconfiguration of an existing MeNB radio bearer. For the uplink, the UE is statically (by RRC reconfiguration) configured to either route Packet Data Convergence Protocol (PDCP) Packet Data Units (PDUs) to the Radio Link Control (RLC) of MeNB 100 or SeNB 200. In the downlink however, PDCP PDUs may be dynamically routed via RLC of MeNB 100 or RLC of SeNB 200 or via both, i.e. duplication, to the UE. The decision is on PDU individual level.

Returning to the implementation options of step S202 of FIG. 2, according to a first way of implementing step S202, the increase in the number of incoming data units can be monitored by eNB 100 and used for identifying, by eNB 100, the imminent end of the slow start phase. In case eNB 100 is implemented as MeNB 100 the number of incoming data units in MeNB 100 during a predetermined time window is monitored. The data units may be buffered in eNB 100 or MeNB 100, respectively. In the following, a buffering in PDCP is assumed for sake of explanation rather than limitation, i.e. the incoming data units are PDCP Service Data Units (SDUs). However, alternatively, the buffer may reside in RLC, i.e. the incoming data units may be RLC SDUs. Either way, the SDUs directly depend on the number of generated TCP segments for transmission. The SDUs are buffered in PDCP (or RLC) before being processed by lower layers for transmission on the radio link. As mentioned above, the number of generated TCP segments increases very fast during the slow start, namely in an exponential manner, while it increases linearly in the congestion avoidance phase. By monitoring the increase in the number of incoming SDUs and comparing it to a threshold, a, larger than 1, eNB 100 or MeNB 100, respectively, can estimate the approaching end of the slow start phase. The eNB 100 or MeNB 100, respectively, monitors that, during a previous window, $n_{t-1}$ SDUs were received in the buffer. The eNB 100 or MeNB 100, respectively, further monitors that, during the current window, $n_t$ SDUs were received. If $n_t/n_{t-1} < \alpha$, then the slow start phase is estimated to be over soon, i.e. the imminent end of the slow start phase is detected by eNB 100 or MeNB 100, respectively. During slow start, the number of SDUs received in the buffer first increases. When approaching the end of the slow start, the number of SDUs normally decreases again from a higher value to a lower value. In this way, the approaching end of the slow start may be determined by means of $n_t/n_{t-1} < \alpha$. The value of $\alpha$ may be chosen to lie within an interval of $1 < \alpha < 10$. For example, $\alpha$ may be chosen as 1.4.

According to a second conceivable way of implementing step S202, the radio link throughput may be monitored by eNB 100 or MeNB 100, respectively, to identify the imminent end of the slow start phase. In accordance therewith, eNB 100 or MeNB 100, respectively, monitors the throughput of the UE over a predetermined time window. The eNB 100 or MeNB 100, respectively, regularly receives Channel Quality Indicator (CQI) and other Channel State Information (CSI) reports from the UE. The eNB 100 or MeNB 100, respectively, thus can estimate the link throughput R that the UE is able to support. For instance eNB 100 or MeNB 100, respectively, can calculate the link throughput R by using Shannon equation R=B*log 2(1+SINR), with B being the system bandwidth and SINR being the signal-to-interference-plus-noise ratio (also known as the signal-to-noise-plus-interference ratio (SNIR)). In reality some practical mapping functions of the SINR to the user throughput can be used. The eNB 100 or MeNB 100, respectively, also knows the load in its cell and how many other UEs need to be scheduled concurrently to the considered UE. The eNB 100 or MeNB 100, respectively, can thus estimate how frequently this UE could be scheduled in a predetermined time window, e.g. $\beta$. The eNB 100 or MeNB 100, respectively, can then estimate the maximum achievable throughput $R_{max}$ for this UE, if there were a lot of data for this UE in the buffer. For instance, $R_{max}$ could be set to $R*\beta$. For example, $\beta$ may be selected from an interval $0<\beta<=1$. Because of the TCP congestion window that starts at low size and increases "slowly" (because of the exponential growth the size of the congestion window increases more slowly in the beginning of the slow start phase than later in the slow start phase), there is not much data for the UE in the buffer at the beginning of the slow start phase. However, when approaching the end of the slow start phase, there is enough data to reach almost the maximum achievable throughput for this UE. In this second way for identifying the imminent end of the slow start phase, eNB 100 or MeNB 100, respectively, monitors the current throughput of the UE over a predetermined time window, R', and compares R' to $R_{max}$. If $R' > \Delta*R_{max}$ (where $0<\Delta<1$ is a factor that can be chosen by eNB 100 or MeNB 100, respectively), then the slow start phase is estimated to be over soon, i.e. the imminent end of the slow start phase is detected by eNB 100 or MeNB 100, respectively.

According to a third conceivable way of implementing step S202, data unit buffer of eNB 100 or MeNB 100, respectively, may be monitored and used for estimating the imminent end of the slow start phase. In other words, the imminent end of the slow start phase is estimated by eNB 100 or MeNB 100, respectively, by monitoring the buffer in which incoming data units are buffered before they are forwarded. Several variants are conceivable for implementing the third way, two of which make use of the buffer fill state over time as shown in FIGS. 4 and 5.

Figure 4:
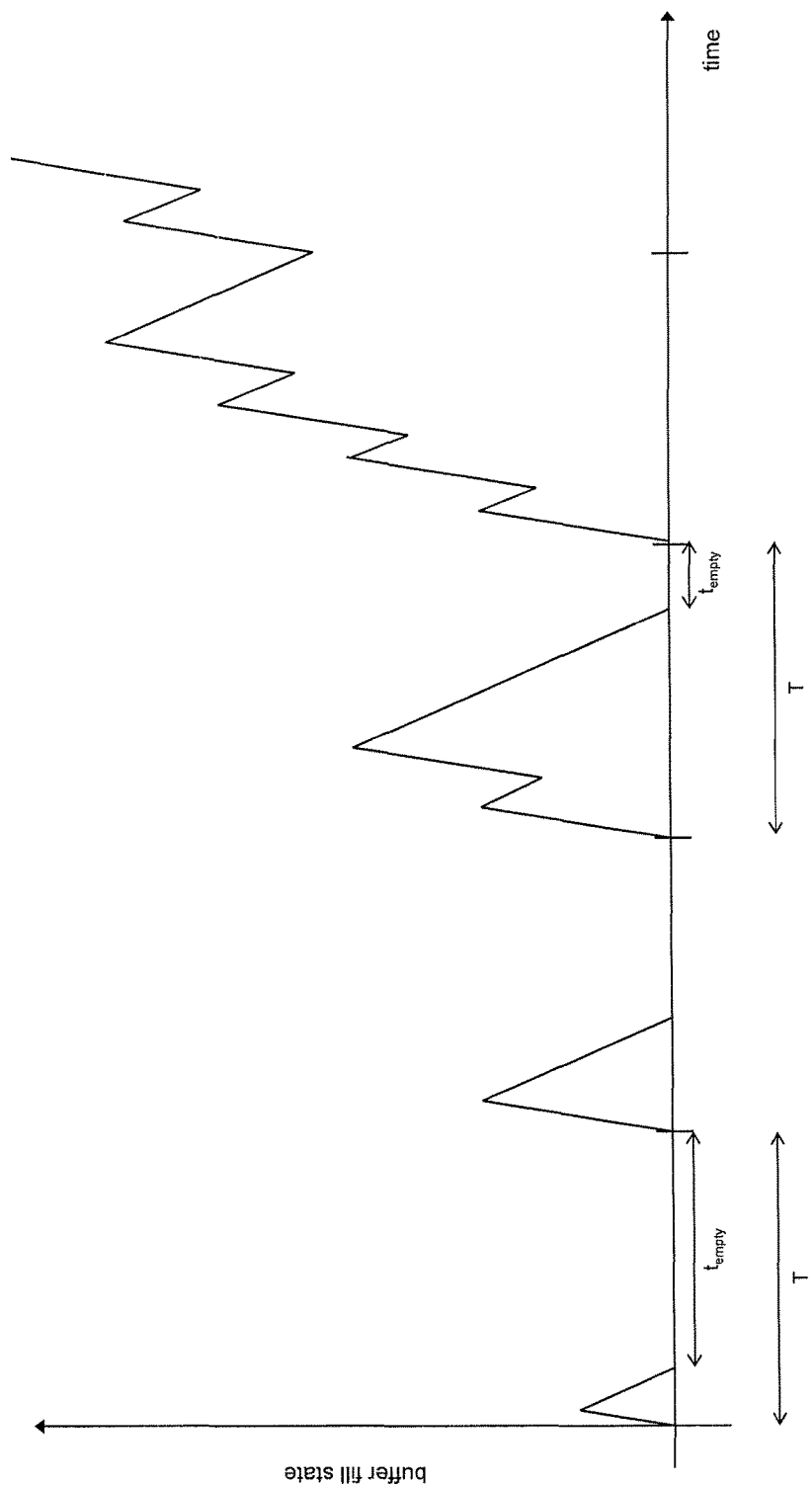
FIG. 4 is a schematic illustration of a buffer fill state over time that can be used in the method embodiment of FIG. 2.

In the variant of FIG. 4, the buffer fill state is monitored by eNB 100 or MeNB 100, respectively. FIG. 4 shows an example plot of the buffer fill state (i.e., the fill state of the buffer in eNB 100 or MeNB 100, respectively) at different times, illustrating how the fraction of time with an empty buffer within a predetermined time window decreases as the end of slow start phase approaches. During slow start, the rate of data flowing into the buffer is lower than the rate with which it is emptied. This causes the buffer to run empty between the arrivals of different TCP transmission bursts. When approaching the end of the slow start phase, the times during which the buffer is empty get shorter, as illustrated by FIG. 4. The eNB 100 or MeNB 100, respectively, records the time $t_{empty}$ during which the buffer is empty within a predetermined time window T. If the fraction of time with the buffer empty, i.e. $t_{empty}/T$, falls below a certain threshold $\delta$, i.e. $t_{empty}/T<\delta$, the slow start phase is estimated to be over soon by eNB 100 or MeNB 100, respectively, i.e. the imminent end of the slow start phase is detected by eNB 100 or MeNB 100, respectively.

Figure 5:
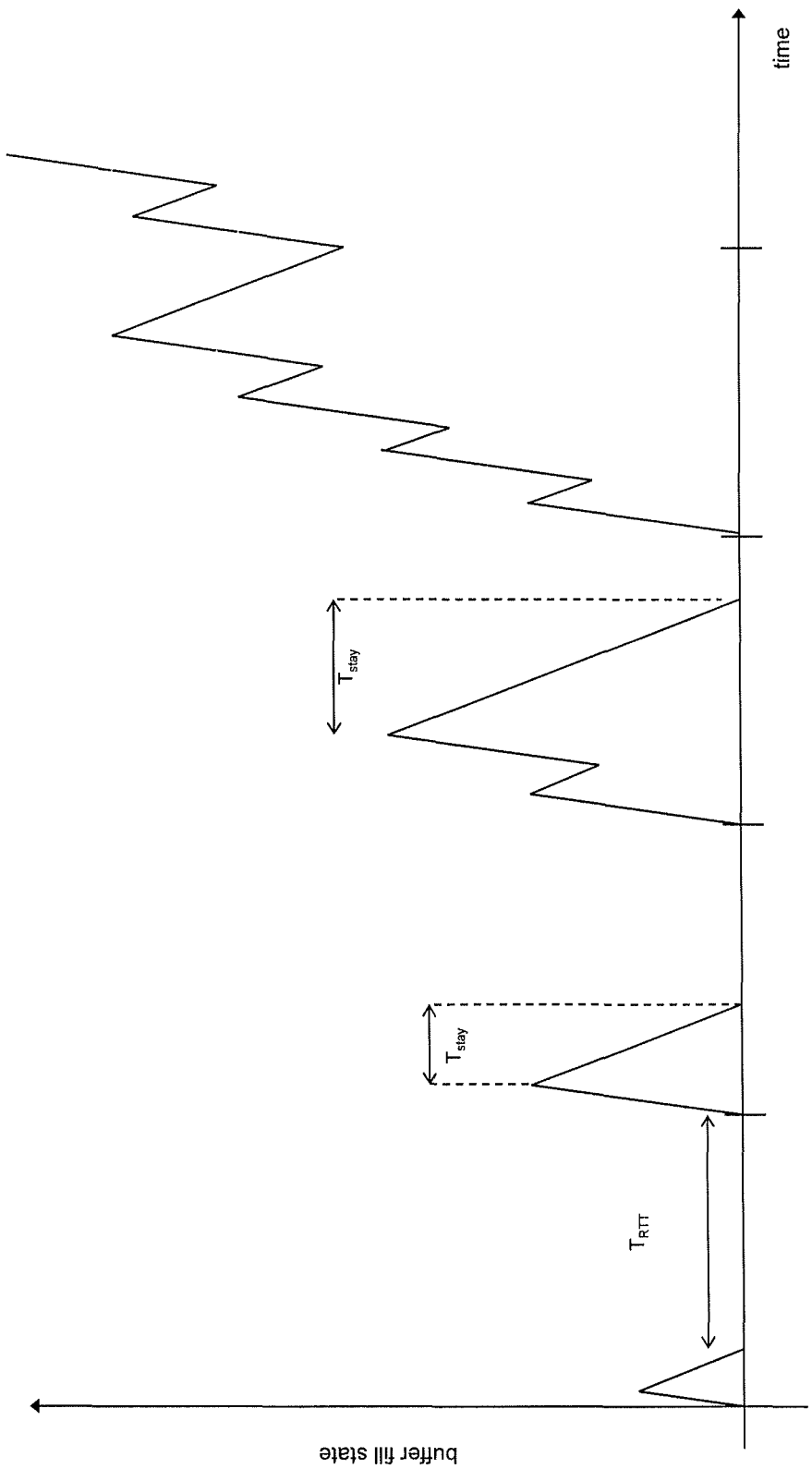
FIG. 5 is a schematic illustration of a buffer fill state over time that can be used in the method embodiment of FIG. 2.

In the variant of FIG. 5, data unit arrival and departure times are monitored by the eNB 100 or MeNB 100, respectively. FIG. 5 shows an example plot of buffer fill state at different times, illustrating how the longest recorded stay in the buffer increases as the end of the slow start phase approaches. When approaching the end of the slow start phase, the last data unit leaves the buffer shortly before the first data unit from the next TCP transmission burst arrives. In this way, eNB 100 or MeNB 100, respectively, estimates the imminent end of the slow start phase. In one possible implementation, eNB 100 or MeNB 100, respectively, monitors the times of data units' arrivals in and departures from the buffer, $t_{arrival}$(data unit) and $t_{depart}$(data unit). From this, the length of stay in the buffer $T_{stay}$(data unit)=$t_{depart}$(data unit)−$t_{arrival}$(data unit) can be determined by eNB 100 or MeNB 100, respectively, for every data unit. Also, the link round trip time $T_{RTT}$ can be estimated by eNB 100 or MeNB 100 by analyzing data unit arrival and departure times. When the longest recorded stay in the buffer max($T_{stay}$) approaches a certain threshold $T_{thr}$, i.e. max($T_{stay}$)>$\varepsilon*T_{thr}$, the slow start phase is estimated to be over soon, i.e. the imminent end of the slow start phase is detected by eNB 100 or MeNB 100, respectively. This threshold can, for example, be set to $T_{RTT}$, or to the estimated time between two TCP transmission bursts calculated from $T_{RTT}$ and the data unit departure times.

Returning to the flow chart of FIG. 2, step S204 of FIG. 2 can be implemented in various ways. In other words, there are various ways to adapt a characteristic of the delivery of the data packets in the wireless communication network.

According to a first implementation of step S204, SeNB 200 link can be activated for split bearer in dual connectivity (DC). DC can be applied between any eNBs connected by any kind of backhaul. The current specification of DC is suitable for a backhaul that can have up to 60 ms latency between MeNB 100 and SeNB 200. DC is a feature of LTE Rel 12 which mainly targets user throughput improvement. By activating SeNB 200 for DC, the characteristic of the delivery of the data packets in the wireless communication network is adapted by optimizing throughput rather than latency. SeNB 200 activation may refer to an initial configuration of the UE to be able to receive and/or transmit on the SeNB 200 cells, as well as a subsequent utilization, i.e. transmission on the SeNB 200 resources, by changed PDCP routing decisions.

However, SeNB 200 activation alone may not be sufficient for throughput optimization. Rather, the timing of SeNB 200 activation, e.g. when to send TCP segments over the SeNB 200 link in addition to the MeNB 100 link (split bearer), may determine the extent of the throughput improvement. According to the first implementation of step S204, the identification of the approaching end of the slow start is used as an input or trigger to decide in favor of the activation of the SeNB 200 link.

For example, if the SeNB 200 link is added to the MeNB 100 link at the beginning of the TCP session (immediate SeNB 200 activation), the early TCP segments are partly sent over MeNB 100 and partly sent over SeNB 200. Correspondingly, the ACKs for the TCP segments going through SeNB 200 are received with an additional delay up to the delay of delivering the TCP segments from MeNB 100 to SeNB 200. This slows down the increase of the congestion window in the slow start phase. As a consequence, if the SeNB 200 is activated too early, e.g. at the beginning of the slow start phase, the higher latency introduced by the SeNB 200 reduces the congestion window increase.

If the SeNB 200 link is added to the MeNB 100 link after the slow start phase (SeNB 200 activation after the TCP slow start), the congestion window may converge exponentially to the size that corresponds to the MeNB 100 link throughput without extra backhaul delay (just as in the non-DC case). The congestion window will (typically) grow until the MeNB 100 total buffer is full and a packet is dropped (or a packet is artificially dropped before by Active Queue Management (AQM)). That is, the exponential growth phase is over after the MeNB 100 link throughput is reached, and thus when activating the SeNB 200 just before the end, it benefits also from the exponential growth. Then, the congestion window will increase linearly in the congestion avoidance phase to finally reach a size that corresponds to the aggregated throughput of the MeNB 100 and SeNB 200 link together.

If the SeNB 200 link is added to the MeNB 100 link just before the end of the slow start phase (SeNB 200 activation just before the end of slow start), the congestion window will converge exponentially to the size that corresponds to the MeNB 100 link throughput without extra backhaul delay (just as in the non-DC case). Then, the exponential growth of the congestion window continues to reach a size that corresponds to the aggregated throughput of the MeNB 100 and SeNB 200 link together. This second growth phase is expected to happen more slowly than the first one because of the backhaul delay between MeNB 100 and SeNB 200. However, the increase in the number of transmitted TCP segments is exponential and not linear as in the previous case (SeNB 200 activation after slow start phase). Further, at this point, the additional backhaul delay does not impact the TCP slow start performance that much anymore, since TCP segments are anyway buffered in the MeNB 100 and would undergo an additional delay also due to the buffering. By activating the SeNB 200 at that point, the MeNB 100 queue is offloaded.

The foregoing shows that SeNB 200 link activation at the end of or after the end of the slow start phase may lead to superior performance as compared to SeNB 200 link activation at the beginning of the slow start phase.

Figure 6:
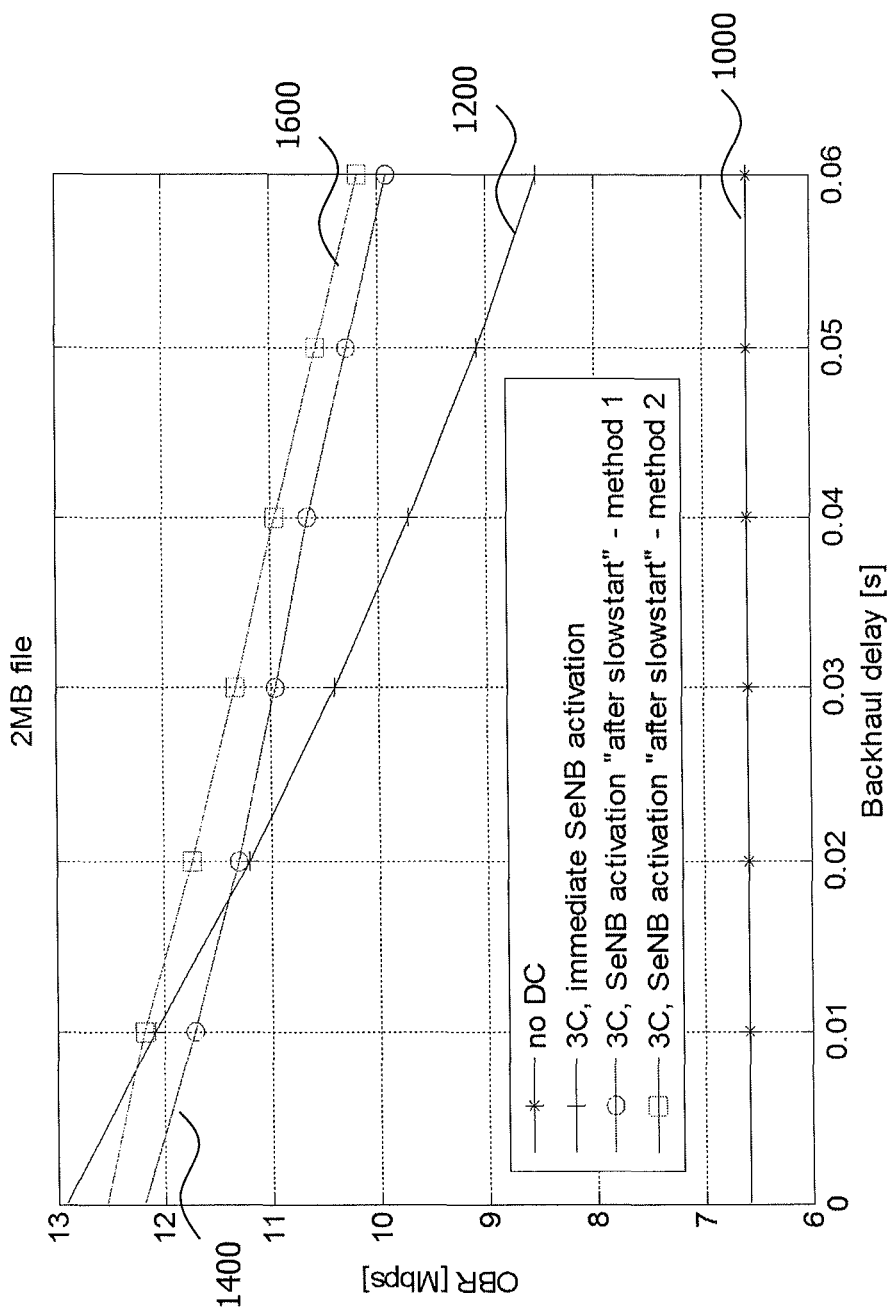
FIG. 6 schematically illustrates throughput over backhaul delay.

This is confirmed by FIG. 6 illustrating a simulation of packet delivery. In FIG. 6, object bitrate (OBR) versus backhaul delay with and without DC is illustrated. Curve 1000 illustrates OBR versus backhaul delay without DC, curve 1200 illustrates OBR versus backhaul delay with dual connectivity (split bearer architecture) and immediate SeNB 200 activation, curve 1400 illustrates OBR versus backhaul delay with dual connectivity and delayed SeNB activation at the end of slow start, and curve 1600 illustrates OBR versus backhaul delay with dual connectivity and delayed SeNB activation at the end of slow start. Both curves 1400 and 1600 show activation at the (imminent) end of the slow start for two different methods described above to identify the imminent end of the slow start. That is, for curve 1400 the imminent end is identified by monitoring the increase in the number of incoming data units and for curve 1600 the imminent end is identified by monitoring the radio link throughput. For all backhaul delays shown in FIG. 6, curve 1000 with no DC provides the lowest OBR (i.e. throughput).

FIG. 6 further shows that at low backhaul delay, an immediate SeNB 200 activation is providing better throughput than a delayed SeNB 200 activation. But from 10 ms or at the latest 20 ms backhaul delay, it is already more efficient to wait until the end of the slow start before activating SeNB 200 so as not to slow down the growth of the TCP congestion window. This is because, as can be seen from FIG. 6, SeNB 200 activation at the end of slow start (curve 1600), where the imminent end is identified by monitoring the radio link throughput, already provides higher OBR than without DC for backhaul delays starting from 10 ms. Further, as can be seen from FIG. 6, SeNB 200 activation at the end of slow start (curve 1400, where the imminent end is identified by monitoring the increase in the number of incoming data units, already provides higher OBR than without DC for backhaul delays starting from 20 ms. At 60 ms backhaul delay, it can be seen that the gain of DC over single connectivity is ~30% with immediate SeNB 200 activation, while it exceeds 50% with delayed SeNB 200 activation.

To summarize, if the MeNB 100 estimates the backhaul delay to be very short, e.g. in the order of 5 ms, it can activate SeNB 200 link directly at the beginning of the TCP session. If the backhaul delay is larger, MeNB 100 will not activate the SeNB 200 link at the beginning of the TCP session. Rather MeNB 100 will monitor the TCP slow start phase and activate the SeNB 200 link at or after the end of the TCP slow start. For this purpose, the imminent end of the slow start is identified in step S202.

According to a second implementation of step S204, latency reduction techniques may be deactivated. In this case, the identification of the approaching end of the TCP slow start is taken as the decision basis to deactivate latency reduction techniques in LTE. A first example for a latency reductions technique that can be deactivated by eNB 100 or MeNB 100, respectively, is technique shorter Transmission Time Interval (TTI). In shorter TTI the RTT of LTE is reduced, but due to additional overhead the maximum achievable throughput is reduced as well. For example, this mode can be deactivated (i.e. going back to TTI=1 ms mode) by eNB 100 or MeNB 100, respectively, as soon as the slow start phase ends. A second example for a latency reduction technique that can be deactivated by eNB 100 or MeNB 100, respectively, is technique semi-persistent-scheduling/pre-scheduling/instant uplink access. In these modes latency is reduced by allowing the UE to access the uplink faster, however to the extent of potentially unnecessarily reserved radio resources. This decreases the overall system capacity. In case of semi-persistent scheduling or pre-scheduling also energy consumption of UE may be higher. For example, these modes can be deactivated by eNB 100 or MeNB 100, respectively, as fast as possible when latency optimization is not necessary anymore, e.g. at the end of or after the slow start phase, when the system goes from the slow start phase (where latency is important to increase the congestion window quickly) to the congestion avoidance phase. Still further, another latency reduction technique that may be deactivated by eNB 100 or MeNB 100, respectively, is a technique offering more robust link adaptation. More robust link adaptation may be achieved by transmitting with lower Modulation Coding Scheme (MCS) for an estimated SINR. More robust transmission is beneficial for latency since less potential retransmissions due to transmission errors are required. However, lower MCS reduces also the throughput. For example, this technique may be deactivated by eNB 100 or MeNB 100, respectively, as soon as the latency optimized mode is not needed anymore, i.e. at the end of or after the TCP slow start phase, when the system goes from the slow start phase (where latency is important to increase the congestion window quickly) to the congestion avoidance phase.

According to a third implementation of step S204, eNB 100 or MeNB 100, respectively, switches from a latency-optimized configuration to a throughput-optimized configuration at the end of or after the slow start phase. During slow start it is beneficial to use the latency-optimized configuration because the congestion window is then increased as quickly as possible. This is because low latency in the latency-optimized configuration leads to an optimized RTT and thus an optimized growth of the congestion window. When the slow start phase ends and TCP enters the congestion avoidance phase, the congestion window does not increase exponentially but only linearly. It thus becomes more important to concentrate on the throughput rather than on latency. Thus, at the end of or after the end of the slow start phase, eNB 100 or MeNB 100, respectively, switches from the latency-optimized configuration to the throughput optimized configuration.

Figure 7:
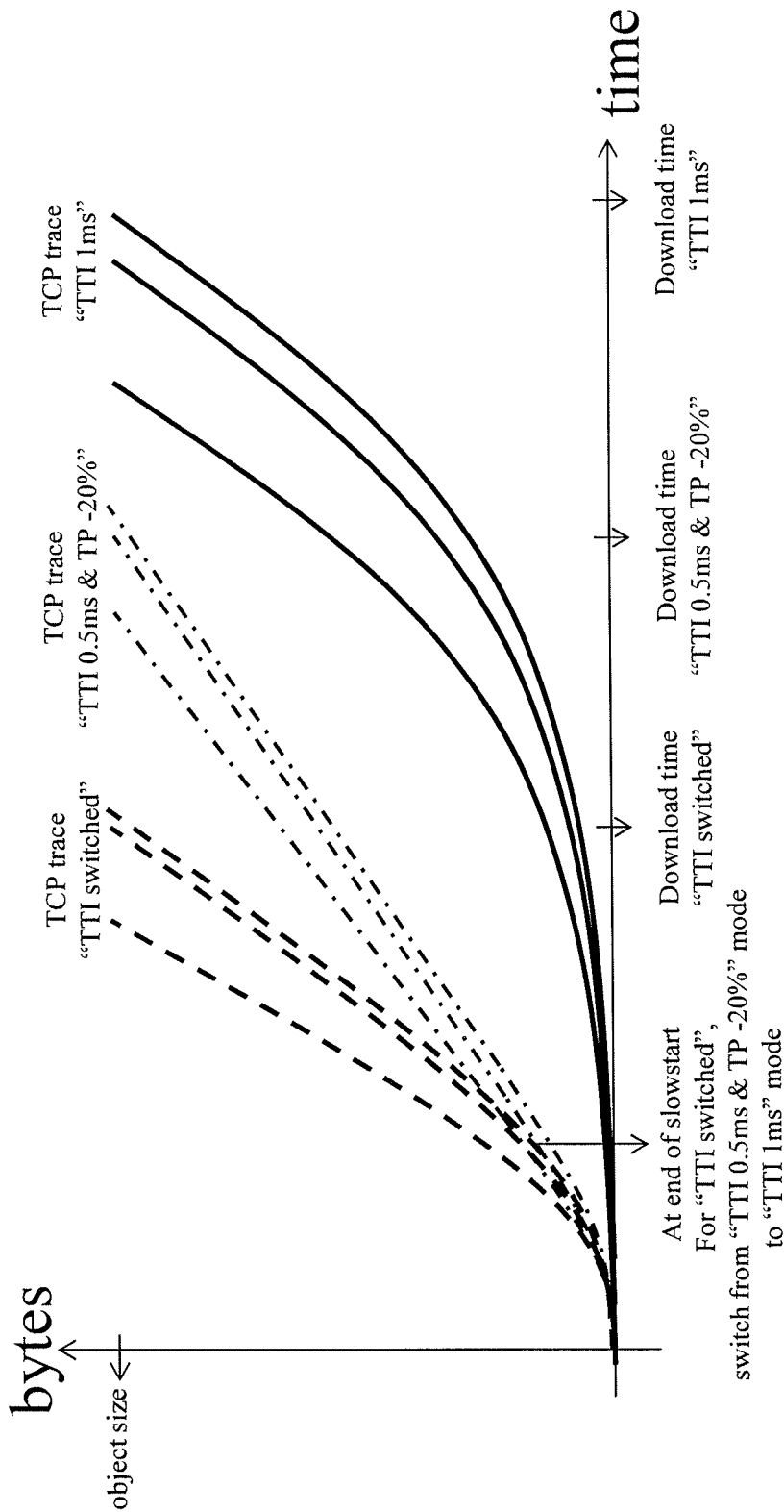
FIG. 7 schematically illustrates TCP traces.

The foregoing is illustrated in FIG. 7. FIG. 7 shows three TCP traces. Each trace consists of three lines, i.e. sequence number of downlink (DL) segment, transmission of ACK in Uplink (UL), and reception of ACK. The RTT is between DL segment transmission time and ACK reception time. The rightmost TCP trace corresponds to an entirely throughput optimized system (TTI=1 ms). The middle TCP trace corresponds to a latency optimized system (TTI=½), which also reduces the maximum throughput by 20%. The leftmost TCP trace, which is the fastest in terms of end user performance, corresponds to a system where a switch is conducted between latency optimized and throughput optimized phase at the TCP slow start end. End user performance is here defined as a total download time, i.e. the time from beginning of a download until the last TCP segment of that download is received and acknowledged. As can be seen from FIG. 7, the latter provides the most superior performance.

According to a fourth implementation of step S204, if the imminent end of the slow start phase is detected, the queue in the buffer of MeNB 100 may be shortcut on SeNB 200 during TCP slow start. As described above, the congestion window, i.e. the number of TCP segments that can be in flight at the same time, is the only limiting factor for the end-to-end data rate during slow start phase. It is therefore beneficial to increase the congestion window as quickly as possible in order to use the full link capacity as soon as possible. Every acknowledged TCP segment increases the congestion window during slow start phase. The time it takes to increase it consequently depends on the delay between sending a packet and receiving its acknowledgments. In order to increase the congestion window as quickly as possible, it is advisable to keep this delivery delay as low as possible for any packet. In LTE dual connectivity, it is therefore beneficial not to activate the SeNB 200 link immediately but only just before the end of or at the end of or after the end of the slow start phase, as described above. Then, the exponential growth of the congestion window continues. But after activation of the SeNB 200 link, the growth is immediately slowed due to the higher delivery delay caused by the backhaul delay. The technique described in the following with respect to FIG. 8 can partially mitigate this effect.

After the SeNB 200 has been activated and the MeNB 100 link is used to its capacity, packets are not instantly forwarded to the SeNB 200 but queued in the MeNB 100, more particularly in queue 160 (or buffer) of MeNB 100. How the packets in this queue are treated depends on the expected time they will have to queue before they can be sent via the MeNB 100. Those packets with an expected queuing time of less than the backhaul delay are never forwarded to the SeNB 200 and remain queued for sending via MeNB 100. Only packets with an expected queuing time larger than the backhaul delay are offered for delivery via the SeNB 200. Therefore, packets forwarded to the SeNB 200 are always shortcutting the queue. They leave the queue while earlier packets that have already been queuing remain there. The latter packets should still arrive at the endpoint faster, because the shortcutting packets will additionally experience the backhaul delay. Thereby it is ensured that, after SeNB 200 activation, every packet is delivered with the shortest possible delay. This makes associated ACKs arrive earlier and the exponential growth of the congestion window does not slow down immediately even after entering of the congestion avoidance phase.

Figure 8:
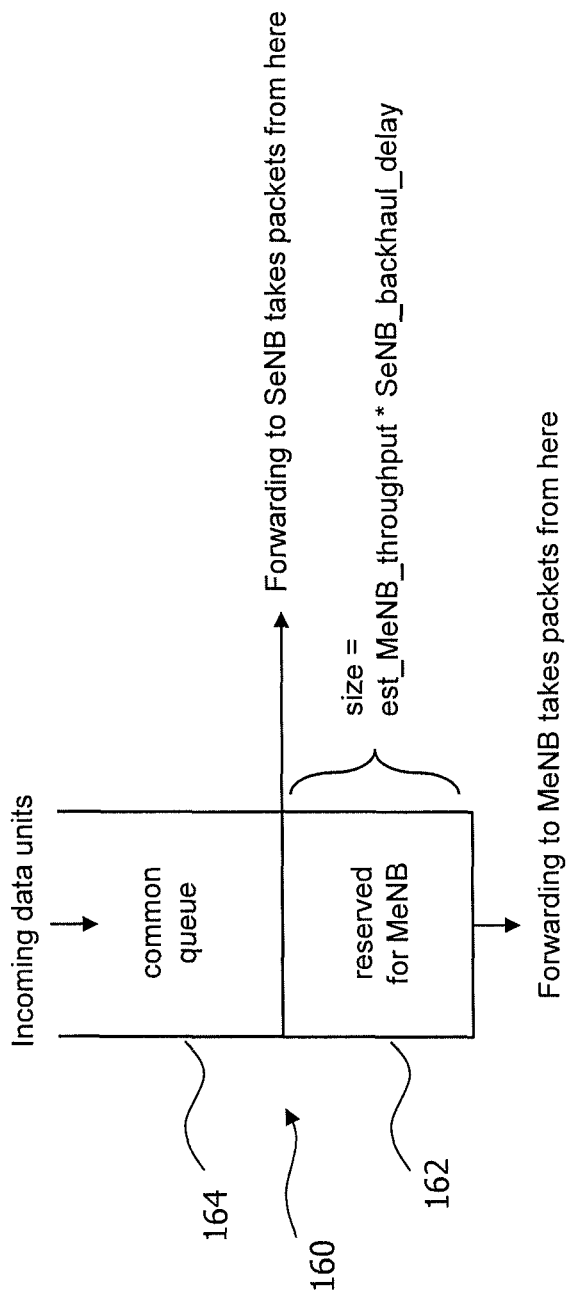
FIG. 8 schematically illustrates a queue that is split into two sections.

One possible embodiment of the foregoing is a queue 160 that is split into two sections, as illustrated in FIG. 8. The packets in the front (first section 162 of queue 160) of the queue have an expected queuing time of less than the backhaul delay and are reserved for the MeNB 100. The SeNB 200 takes packets from further back in the queue (second section 164 of queue 160). Those packets leave the queue earlier than packets in the front (first section 162), effectively shortcutting the queue.

In an example situation involving the queue 160 of FIG. 8, there could be a backhaul delay of 20 ms. The slow start phase is almost over and the MeNB 100 link provides a data rate of 10,000,000 byte/s which is completely used. 90,000 byte of data is queuing in the MeNB 100. A new data unit of 10,000 byte arrives. It will take 9 ms to send the data units that are already in the queue 160 and another 1 ms to transmit the new data unit. This leads to an expected queuing time of 10 ms, which is shorter than the backhaul delay. Consequently, the data unit is not forwarded to the SeNB 200, even though the MeNB 100 link is occupied and SeNB 200 link has free capacity. After some time, 200,000 byte of data is queuing. Another new data unit of 10,000 byte arrives. Before it could be sent via the MeNB 100, it would have to wait for 20 ms for the data units that are ahead of it to be sent. In the same amount of time, the data unit could also pass the backhaul to the SeNB 200, where there is free capacity. The new data unit therefore shortcuts the queue and is sent straight to the SeNB 200. The data units in the queue 160 remain queued, as they can still expect to be transmitted earlier.

Figure 9:
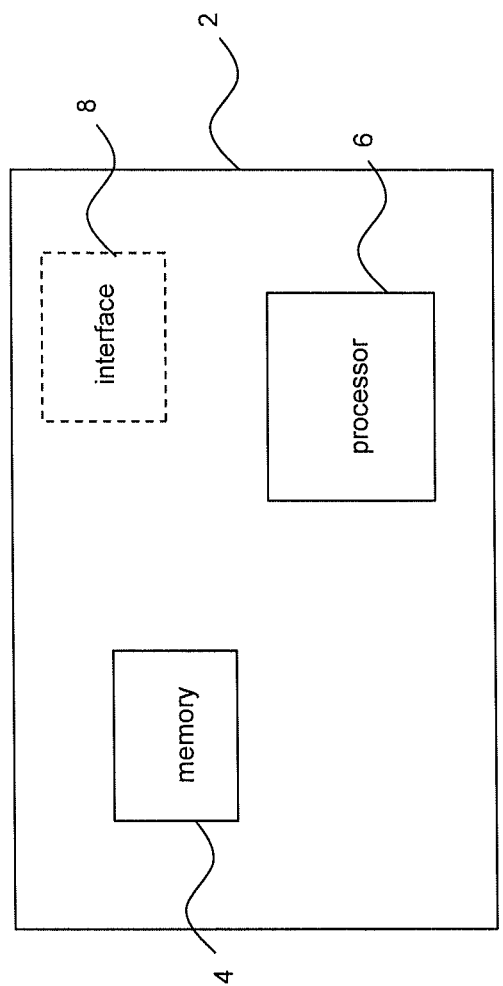
FIG. 9 is a block diagram schematically illustrating an embodiment of a base station.

The details explained above with respect to FIGS. 1 to 8 may be summarized with respect to FIG. 9. FIG. 9 is a block diagram schematically illustrating a device embodiment of a base station 2 for supporting delivery of data packets using Transmission Control Protocol (TCP) in a wireless communication network.

By way of example, the base station 2 is described to implement the functionalities of the base station 100 according to the embodiment of FIG. 1. The base station 2 comprises a memory 4 and a processor 6. Optionally, the base station may comprise an interface 8. The memory 4 contains control instructions executable by the processor 6. The processor 6 is configured to identify an imminent end of a slow start phase of TCP congestion control. The processor 6 is further configured to adapt a characteristic of the delivery of the data packets in the wireless communication network. The interface 8 may be configured to carry out any communication with other components of the communication network. For example, the interface 8 may transmit information to other components of the communication network and/or may receive information from other components of the communication network.

Figure 10:
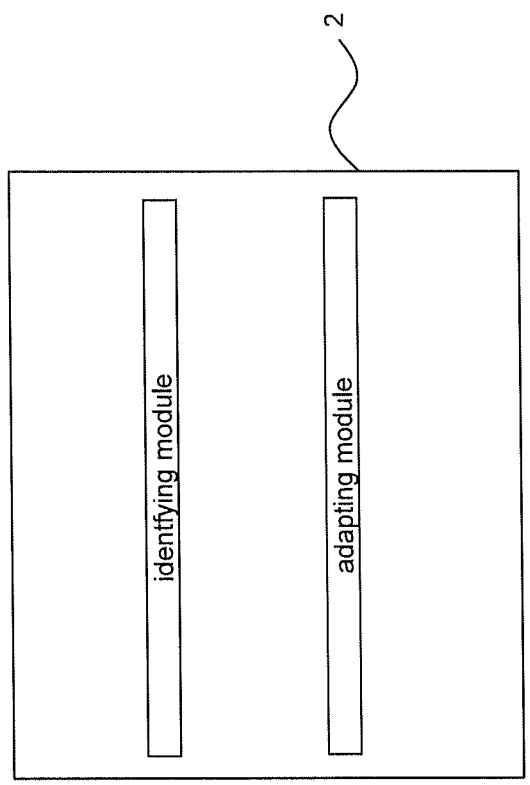
FIG. 10 is a block diagram schematically illustrating a further embodiment of a base station.

FIG. 10 shows a functional block diagram of a base station 2 configured in accordance with the principles of the disclosure as described above. The functional blocks of the base station 2 may be implemented by hardware, software, or a combination of hardware and software to carry out the principles of the disclosure. It is understood by a person skilled in the art that the functional blocks described in FIG. 10 may be combined or separated into sub-blocks to implement the principles of the disclosure as described above. Therefore, the description herein may support any possible combination or separation or further definition of the functional blocks described herein. The base station 2 of FIG. 10 is for supporting delivery of data packets using Transmission Control Protocol (TCP) in a wireless communication network. The base station 2 comprises an identifying module for identifying an imminent end of a slow start phase of TCP congestion control. The base station 2 further comprises an adapting module for adapting a characteristic of the delivery of the data packets in the wireless communication network.

Many advantages of the present disclosure will be fully understood from the foregoing description, and it will be apparent that various changes may be made in the form, construction and arrangement of the units and devices without departing from the scope of the present disclosure and/or without sacrificing all of its advantages. Since the present disclosure can be varied in many ways, it will be recognized that the present disclosure should be limited only by the scope of the following claims.

The invention claimed is:

1. A method of supporting delivery of data packets using Transmission Control Protocol (TCP) in a wireless communication network, the method comprising:
    estimating, by a base station of the wireless communication network, an imminent end of a slow start phase of TCP congestion control based one or more of the following:
        a number of data packets received by the base station during a first predetermined time window,
        a throughput of a terminal, served by the base station, during a second predetermined time window,
        a time during which a buffer of the base station for buffering data packets is empty;
        a time length of a stay of a data packet in a buffer of the base station; and
    adapting, if the imminent end of the slow start phase is estimated, a characteristic of the delivery of the data packets in the wireless communication network.

2. The method of claim 1, wherein the estimating the imminent end of the slow start phase based on the number of data packets received by the base station during the first predetermined time window comprises the base station:
    monitoring a number of data packets received during the first predetermined time window; and
    estimating that the end of the slow start phase is imminent if a ratio of the number of data packets received during the first predetermined time window to the number of data packets received during a time window previous to the first predetermined time window is smaller than a first predetermined threshold value.

3. The method of claim 1, wherein the estimating the imminent end of the slow start phase based on the throughput of the terminal during the second predetermined time window comprises the base station:
    monitoring a current throughput of the terminal over the second predetermined time window;
    estimating a maximum achievable throughput of the terminal; and
    estimating that the end of the slow start phase is imminent if a ratio of the current throughput of the terminal to the maximum achievable throughput of the terminal is larger than a second predetermined threshold value.

4. The method of claim 1, wherein the estimating the imminent end of the slow start phase based on the time during which the buffer of the base station for buffering data packets is empty comprises:
    recording, within a third predetermined time window, a time during which a buffer of the base station for buffering data packets is empty; and
    estimating, by the base station, that the end of the slow start phase is imminent if a ratio of the time during which the buffer of the base station is empty to the third predetermined time window is smaller than a third predetermined threshold value.

5. The method of claim 1, wherein the estimating the imminent end of the slow start phase based on the time length of the stay of the data packet in the buffer of the base station comprises:
    monitoring a time instance at which the data packet arrives at the buffer of the base station;
    monitoring a time instance at which the data packet departs from the buffer of the base station;
    determining the time length of the stay of the data packet in the buffer of the base station based on the monitored time instance at which the data packet departs from the buffer of the base station and the monitored time instance at which the data packet arrives at the buffer of the base station; and estimating that the end of the slow start phase is imminent if the time length of the stay of the data packet in the buffer of the base station is larger than a fourth predetermined threshold value.

6. The method of claim 1, wherein the adapting comprises activating, by the base station, a secondary base station for dual connectivity.

7. The method of claim 6, wherein the activating the secondary base station for dual connectivity comprises activating, by the base station, the secondary base station for dual connectivity at the end or after the end of the slow start phase.

8. The method of claim 1, wherein the adapting comprises deactivating, by the base station, one or more currently activated latency reduction techniques.

9. The method of claim 8, wherein the one or more currently activated latency reduction techniques comprise at least one of: a shorter Transmission Time Interval technique, a pre-scheduling technique, a semi-persistent scheduling technique, an instant uplink access technique, and a more robust link adaptation technique.

10. The method of claim 1, wherein the adapting comprises switching, by the base station, from a latency-optimized configuration to a throughput-optimized configuration, the latency-optimized configuration having a lower latency than the throughput-optimized configuration, and the throughput-optimized configuration having a higher throughput than the latency-optimized configuration.

11. The method of claim 1, wherein the adapting comprises, after an activation of a secondary base station for dual connectivity, the base station forwarding one or more data packets to the secondary base station if an expected queuing time of the one or more data packets in a buffer of the base station is equal to or larger than an expected delivery time of the one or more data packets to the secondary base station.

12. The method of claim 1, further comprising, after an activation of a secondary base station for dual connectivity, the base station stopping forwarding one or more data packets to the secondary base station if an expected queuing time of the one or more data packets in a buffer of the base station is smaller than an expected delivery time of the one or more data packets to the secondary base station.

13. A non-transitory computer readable recording medium storing a computer program product for supporting delivery of data packets using Transmission Control Protocol (TCP) in a wireless communication network, the computer program product comprising software instructions which, when run on processing circuitry of a base station of the wireless communications network, causes the base station to:

estimate an imminent end of a slow start phase of TCP congestion control based one or more of the following:
 a number of data packets received by the base station during a first predetermined time window,
 a throughput of a terminal, served by the base station, during a second predetermined time window,
 a time during which a buffer of the base station for buffering data packets is empty;
 a time length of a stay of a data packet in a buffer of the base station; and adapt, if the imminent end of the slow start phase is estimated, a characteristic of the delivery of the data packets in the wireless communication network.

14. A base station for supporting delivery of data packets using Transmission Control Protocol in a wireless communication network, the base station comprising:
 processing circuitry;
 memory containing instructions executable by the processing circuitry whereby the base station is operative to:
  estimate an imminent end of a slow start phase of TCP congestion control based on one or more of the following:
   a number of data packets received by the base station during a first predetermined time window;
   a throughput of a terminal, served by the base station, during a second predetermined time window;
   a time during which a buffer of the base station for buffering data packets is empty;
   a time length of a stay of a data packet in a buffer of the base station;
  adapt, if the imminent end of the slow start phase is estimated, a characteristic of the delivery of the data packets in the wireless communication network.

15. The base station of claim 14, wherein the instructions are such that the base station is operative to adapt the characteristic of the delivery of the data packets by switching from a latency-optimized configuration to a throughput-optimized configuration, the latency-optimized configuration having a lower latency than the throughput-optimized configuration and the throughput-optimized configuration having a higher throughput than the latency-optimized configuration.

16. A wireless communication system, comprising:
 one or more terminals;
 a base station supporting delivery of data packets using Transmission Control Protocol in the wireless communication system, the base station comprising:
  processing circuitry;
  memory containing instructions executable by the processing circuitry whereby the base station is operative to:
   estimate an imminent end of a slow start phase of TCP congestion control based on one or more of the following:
    a number of data packets received by the base station during a first predetermined time window;
    a throughput of a terminal, served by the base station, during a second predetermined time window;
    a time during which a buffer of the base station for buffering data packets is empty;
    a time length of a stay of a data packet in a buffer of the base station;
   adapt, if the imminent end of the slow start phase is estimated, a characteristic of the delivery of the data packets in the wireless communication network.

* * * * *